Patented Sept. 10, 1940

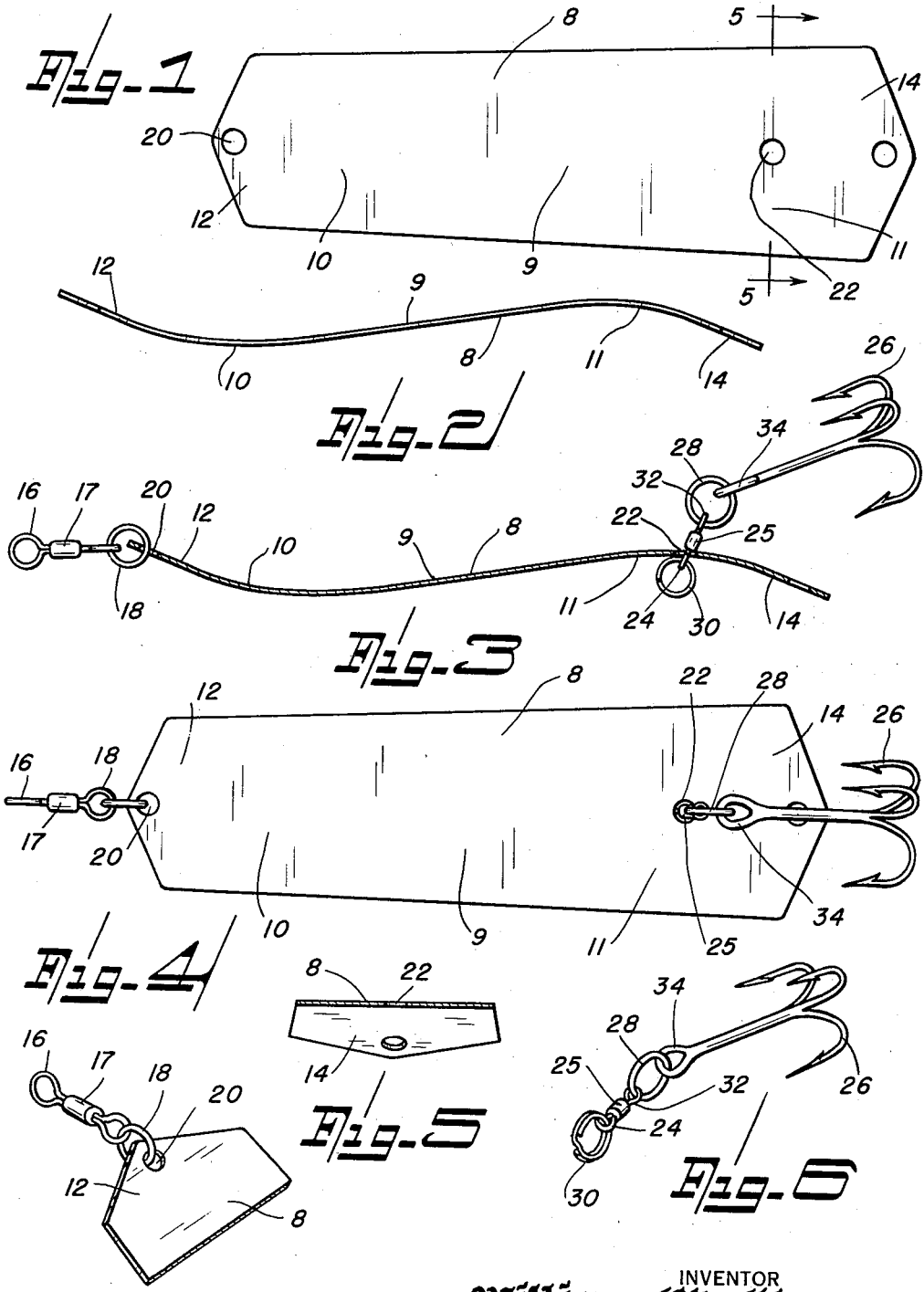

2,214,266

UNITED STATES PATENT OFFICE 2,214,266

TROLLING LURE AND HOOK ATTACHMENT MEANS THEREFOR

William M. Haury, Seattle, Wash.

Application December 5, 1939, Serial No. 307,697

5 Claims. (Cl. 43—45)

My present invention relates to the general art of fishing or trolling lures made from sheet metal, and more particularly to a trolling lure and hook attachment means therefor.

My invention consists essentially of a trolling lure made from sheet metal stock having a reverse bend therein to give the desirable swimming and darting action which simulates, quite closely, the movement of a herring through the water, so as to approximate the natural food of the salmon, particularly, in the taking of which my spoon is especially effective. My lure is further provided with a swivel attaching means for the hook used with it. This attachment consists essentially of providing an opening intermediate the ends of the spoon, and closer to one end than the other, through which the eye of a small swivel is passed and then in turn through the eye is passed a split ring, so as to provide an easily removable anchor for the swivel. By this means, the eye of the hook is held slightly away from the tail portion of the lure and, due to the swiveling action, it is possible to use the highly desirable treble hook without danger of the same fouling or catching on any portion of the spoon.

The ordinary commercial fisherman, who fishes for salmon and like fish that take trolling lures, usually employs a plurality of master trolling lines. These are normally weighted with large weights varying from 20 to as much as 80 pounds. The main line is usually made of braided wire so that the resistance through the water as the line is trolled will be at a minimum and thus considerable depth can be obtained, without excessively heavy sinkers, considering the resistance not only of the line, but of the multiplicity of lures that will be secured to this main line at varying depths. In this manner it is not uncommon for a commercial troller to employ 4 to 6 main lines each with possibly a dozen or more connectors to which are tied the leading line or leaders for separate lures. Inasmuch as the work and time involved in paying out and taking in these lines is considerable, it normally is not done until fish have struck the line, and under conditions such as this it is imperative that the lures themselves not be tangled, but that the hook will be, at all times, in the position best to hook a striking fish. In the past, with the conventional means of securing a single heavy hook to the tail portion of the spoon as by a soldered ring, the efficiency of the lure was considerably reduced. With my new improved hook attaching means, however, the danger of tangling, or the hook being caught on the spoon, is entirely overcome and, as a result, the fisherman can now employ the treble hook arrangement.

The principal object of my present invention, therefore, is to provide a single-piece, metal lure that can be formed cheaply, without resorting to expensive dies for forming intricate configurations; and also one that, because of its true curves, can be adjusted by hand to meet varying fishing conditions.

A further object of my present invention is to provide hook attaching means which, in addition to providing a nontangling hook arrangement, provides elements for the creating of turbulence so that the effect of the more carefully formd spoons having deep rear pockets can be achieved in a very economical manner.

Other and more specific objects will be apparent from the following description taken in connection with the accompanying drawing, wherein:

Figure 1 is a top plan view of a spoon body formed after the teachings of my invention.

Figure 2 is a side elevation of the spoon body shown in Figure 1.

Figure 3 is a longitudinal sectional view through a completed lure, showing the line-attaching swivel and the means by which the treble hook is secured to the body of the lure.

Figure 4 is a top plan view of the completed lure as shown in section in Figure 3.

Figure 5 is a cross-sectional view taken along the line 5—5 of Figure 1.

Figure 6 is a perspective view showing the desirable type of treble hook, for use with my spoon, together with the swivel and split ring used in attaching the same to the body of my lure.

Figure 7 is a perspective view showing, in fragmentary form, the leading or head end of my lure with the swivel attaching means and illustrating the flat, transverse section of my lure.

Referring to the drawing, throughout which like reference characters indicate like parts, 8 generally designates the body of my spoon or lure. This I prefer to form from well-tempered metal of the non-rusting or tarnishing type normally stainless steel or brass. I have found it most desirable to form the spoon with a substantially flat portion 9 disposed in the center of the spoon which terminates in the rather gradual curves at 10 and 11, and then to have a head or leading portion 12 and a tail portion 14 that is substantially straight. It will be noted in Figures 1 and 4 that I have provided that the two sides of the spoon diverge slightly so as to make the head of the spoon narrower than the rear end so that as the spoon is drawn through the water there will be sufficient excess water-impinging surface in the rear of the spoon to compensate for the extra weight of the hook which is secured near the rear of the spoon. I then provide the leading and trailing ends of the spoon with a blunt point substantially as illustrated.

The draft or fishing line is attached to ring 16 of the swivel 17. This swivel is in turn secured to the leading end of the spoon as by the brazed or soldered ring 18 which seats in opening 20 formed in the leading end of the spoon.

My preferred form of hook attachment is to provide an opening, as 22, disposed somewhat forward of the rear end of the spoon, and on the medial line thereof, and to pass through this opening the leading eye 24 of swivel 25. The swivel is secured to a treble hook 26 by means of a soldered or brazed ring 28. The loop of the swivel 24, however, after it has passed through opening 22 has secured in it, preferably, the split ring 30. This split ring must, of necessity, be considerably larger than opening 22, as it serves to anchor the small swivel 25 to the body of the spoon, and by providing that the swivel loop 24 is of limited longitudinal extent, ring 30 tends to cause the opposite end of the swivel as 32 to stand out from the body of the spoon. This in turn forces the eye 34 of the treble hook 26 well out from the body of the spoon. When so arranged, it has been found that the treble hook can in no way be folded back if the portions shown are reasonably observed so that the hooks cannot in any way become fouled on the body of the lure. This is a matter of great concern to the average commercial fisherman, as when he passes a lure over the side of his boat he has no further opportunity to inspect the same, and if it becomes fouled it means that a considerable period of fishing time has been wasted.

The anchoring of a treble hook, as illustrated in Figures 3 and 4 particularly, places the barbed hook very close to the end of the lure so that, as a fish strikes the lure, the likelihood of its being hooked is greatly increased over those types of commercial spoons where a single barbed hook is employed. It has further been found that the free action of swivel 25 produces less resistance to the normal free action of a spoon, consequently the lure gyrates so as to provide the best possible simulation of a herring, which is the natural food of the salmon, the fishing for which my spoon is particularly adapted. Ring 30 and the outstanding swivel 25 create a turbulence as the lure is drawn through the water similar to that created by a swimming herring, when it is accelerating its speed, and thus the lifelike illusion of the lure is greatly improved.

The foregoing description and the accompanying drawing are believed to clearly disclose a preferred embodiment of my invention, but it will be understood that this disclosure is merely illustrative and that such changes in the invention may be made as are fairly within the scope and spirit of the following claims.

I claim:

1. A trolling lure comprising a spoon in the shape of a compound curve, said spoon having a central hole forward of its trailing end, a swivel having its shank extending through said hole and provided with eyes at opposite sides of the spoon, an anchoring ring detachably connected with the eye at the concave side of the spoon, a hook-ring attached to the eye at the convex side of the spoon, and a hook attached to the second eye.

2. A trolling lure comprising a spoon substantially in the shape of a compound curve and having a straight leading end, a straight trailing end, and an intermediate straight portion, said spoon having a central opening between the straight trailing end and the straight intermediate portion, a swivel mounted in said opening with an eye at the concave side of the spoon and a detachable anchoring ring connected with said eye, said swivel having another eye at the convex side of the spoon, a hook-ring connected with the second eye, and a hook connected with the hook-ring.

3. A trolling lure comprising a sheet metal spoon tapering in dimensions from the trailing end to the leading end and fashioned in the form of a compound curve, said spoon having a central hole forward of its trailing end, a swivel mounted in said hole with an eye projecting at the concave side of the spoon and a split anchoring-ring connected with said eye, the body of the swivel and a second eye being located at the convex side of the spoon, a hook-ring connected with the second eye, and a hook connected with said hook ring.

4. A trolling lure comprising a sheet metal spoon having a central hole forward of its rear end, a swivel mounted in the hole and having eyes at opposite sides of the spoon, a detachable anchoring ring connected with one eye, and a hook loosely connected with the other eye, whereby the rear end of the hook extends beyond the rear end of the lure in position to prevent fouling of the hook with the spoon.

5. A trolling lure comprising a sheet metal spoon formed as a compound curve, said spoon having a central hole forward of its trailing end, connecting means mounted in said hole, and means for preventing displacement of said connecting means comprising an attaching ring connected to said connecting means at a concave side of the spoon, a hook-ring loosely connected to the connecting means at the convex side of the spoon, and a hook connected to said hook-ring with its rear end projecting beyond the trailing end of the spoon.

WILLIAM M. HAURY.